(12) United States Patent
Yan et al.

(10) Patent No.: US 9,021,787 B2
(45) Date of Patent: May 5, 2015

(54) FLUID DELIVERY APPARATUS WITH FLOW RATE SENSING MEANS

(76) Inventors: Mi Yan, Columbus, IN (US); Baohua Qi, Columbus, IN (US)

( * ) Notice: Subject to any disclaimer, the term of this patent is extended or adjusted under 35 U.S.C. 154(b) by 154 days.

(21) Appl. No.: 13/604,279

(22) Filed: Sep. 5, 2012

(65) Prior Publication Data

US 2014/0060015 A1    Mar. 6, 2014

(51) Int. Cl.
| | | |
|---|---|---|
| *F01N 3/00* | (2006.01) | |
| *F01N 3/20* | (2006.01) | |
| *F01N 11/00* | (2006.01) | |
| *G05D 7/06* | (2006.01) | |

(52) U.S. Cl.
CPC .............. *F01N 3/208* (2013.01); *F01N 11/00* (2013.01); *G05D 7/0635* (2013.01); *F01N 2560/07* (2013.01); *F01N 2560/20* (2013.01); *F01N 2610/02* (2013.01); *F01N 2610/148* (2013.01); *F01N 2900/0416* (2013.01); *F01N 2900/12* (2013.01); *F01N 2900/1411* (2013.01); *F01N 2900/1811* (2013.01); *F01N 2900/1812* (2013.01); *Y02T 10/47* (2013.01); *Y02T 10/24* (2013.01)

(58) Field of Classification Search
USPC ........... 60/274, 286, 289, 292, 295, 298, 301, 60/303, 276
See application file for complete search history.

(56) References Cited

U.S. PATENT DOCUMENTS

| | | | | |
|---|---|---|---|---|
| 5,522,218 A | * | 6/1996 | Lane et al. ...................... | 60/274 |
| 5,654,507 A | | 8/1997 | Hicks et al. | |
| 6,167,698 B1 | * | 1/2001 | King et al. ...................... | 60/286 |
| 6,273,120 B1 | * | 8/2001 | Hofmann et al. ............... | 137/98 |
| 6,470,741 B1 | | 10/2002 | Fathollahzadeh | |
| 6,761,025 B1 | * | 7/2004 | Gladden ......................... | 60/286 |
| 7,017,335 B2 | * | 3/2006 | Huber et al. .................... | 60/286 |
| 7,357,035 B2 | | 4/2008 | Liu et al. | |
| 7,905,085 B2 | * | 3/2011 | Henning et al. ................ | 60/277 |
| 8,132,405 B2 | * | 3/2012 | Katou et al. .................... | 60/301 |
| 8,281,572 B2 | * | 10/2012 | Chi et al. ........................ | 60/286 |

OTHER PUBLICATIONS

S.C. Morris and J.F. Foss, Transient thermal response of a hot-wire anemometer, Measurement science and technology, 2003, 251-259, vol. 14, IOP Publishing Ltd., UK.

(Continued)

*Primary Examiner* — Binh Q Tran

(57) ABSTRACT

A fluid delivery apparatus with a flow sensing means for delivering a first fluid into a second fluid. In a fluid delivery apparatus using a common rail method, which produces a pulsated flow, the flow sensing means generates sensing signals indicative of the flow rate and the temperature of the second fluid, the delivery rate of the first fluid, and the evaporating rate of the first fluid, while in a fluid delivery apparatus using a pump metering method, the flow sensing means is able to provide a sensing signal indicative of the delivery rate of the first fluid. The sensing signals can be used in a feedback control for controlling delivery rate, in limiting delivery rate according to the evaporation capability of the first fluid, and in a diagnostic system detecting failures and abnormalities in the fluid delivery apparatus.

13 Claims, 16 Drawing Sheets

(56) References Cited

OTHER PUBLICATIONS

P. Ligeza, Constant-bandwidth constant-temperature hot-wire anemometer, Review of science instruments, 2007, 075104-1~6, vol. 78, American Institute of Physics.

Noraznafulsima Khamshah, Ahmed N. Abdalla, S. P. Koh, and Hassan Farhan Rashag, Issues and temperature compensation techniques for hot wire thermal flow sensor: A review, International Journal of Physical Sciences, 3270-3278, vol. 6(14), Academic Journals.

* cited by examiner

|  | Common rail dosing apparatus | Air-assisted dosing apparatus |
|---|---|---|
| $D_{on}$ | Issues in common rail pressure control & injector nozzle | Pumping control issues |
| $T_{on}$ | Solenoid control issues | N/A |
| $V_I$ | Exhaust flow sensor rationality | N/A |

FIG. 8b

FLUID DELIVERY APPARATUS WITH FLOW RATE SENSING MEANS

FIELD OF THE INVENTION

The present invention relates to a fluid delivery apparatus for delivering a first fluid into a second fluid, more particularly, to a fluid delivery apparatus with a flow rate detection means for metering and delivering a first fluid into a flow of a second fluid.

BACKGROUND OF THE INVENTION

In mixing two fluids together to create a mixture with the amount of a first fluid precisely controlled, normally a fluid delivery device is needed for metering and delivering the first fluid into a second one. Metering methods in the fluid delivery apparatus include a pump metering method, in which a metering pump is used to precisely control the amount of the first fluid to be delivered, and a common rail method, in which the first fluid is contained in a common rail or a buffer chamber with its pressure controlled higher than that of the second fluid, and the metering is achieved by controlling the open time of a nozzle fluidly connected to the common rail. To mix the two fluids uniformly, in delivering the first fluid into the second one, typically the fluid delivery device needs to have the first fluid atomized into small droplets. In a fluid delivery apparatus using the common rail method, since the pressure in the common rail can be controlled high, a good atomization can be achieved with small nozzle orifice and high common rail pressure. In a fluid delivery apparatus with metering pump, however, since the metering pump is for controlling delivery amount of the first fluid, delivering pressure is not controlled. To have a good atomization, normally a third fluid, e.g., a compressed air is used to assist atomization.

An example of such a fluid delivery apparatus is a reductant delivery apparatus in an exhaust gas treatment system of an internal combustion engine. Environmentally harmful species in the exhaust gas emitted from an internal combustion engine, such as hydrocarbons (HC), carbon monoxide (CO), particulate matters (PM), and nitric oxides (NOx) are regulated species that need to be removed from the exhaust gas. In lean combustion engines, due to the existence of large amount oxygen excess, passive means without extra dosing agents, such as a three-way catalyst apparatus used commonly in spark-ignition engines, normally are not able to effectively remove the oxidative specie NOx. To reduce NOx in lean combustion engines, a variety of active means with reducing agents (reductants) being dosed in exhaust gas are developed. In these technologies, the reductant is metered and injected by a fluid delivery apparatus into the exhaust gas, and the result mixture flows into a SCR (Selective Catalytic Reduction) catalyst, where the reducant selectively reacts with NOx generating non-poisonous species, such as nitrogen, oxygen, carbon dioxide, and water.

To have a fine atomization, in the fluid delivery apparatus, normally the first fluid is sprayed into the second fluid. This type of fluid delivery creates a difficulty in measuring actually delivered amount of the first fluid in the second fluid. Another difficulty in measuring actually delivered first fluid is caused by the harsh environment in the second fluid. For example, in an exhaust gas treatment system, the second fluid is exhaust gas, which has high temperature and contains high moisture, particulate matter, and possibly reactive gas species, such as NOx, SOx, and CO. In such an environment, it is difficult to position a normal flow sensor in the second fluid. The lack of sensing means that is able to measure the actually delivered first fluid results in that the delivery accuracy relies on the performance and reliability of the delivery components in the fluid delivery apparatus, since errors caused by the delivery components cannot be compensated in system level. For example, in an apparatus with common rail control, pressure control performance, nozzle orifice size, and nozzle opening control performance determine delivery accuracy, and the metering pump control performance is the major factor affecting delivery accuracy in a fluid delivery apparatus with pump metering if there is no feedback compensation.

Furthermore, in applications where the first fluid is a liquid and the second fluid is gaseous, sometimes the first fluid needs to be evaporated in the second fluid. For example, in a SCR exhaust gas treatment system, the first fluid is a urea solution. It needs to be evaporated in the second fluid, which is exhaust gas. In the evaporation process, if the second fluid is not able to provide enough thermal energy, then the first fluid may condense and cause issues. In the example of the SCR exhaust gas treatment system, when the urea solution condenses on exhaust pipe, it may polymerize and crystallize, forming solid deposits, which may grow and eventually block exhaust flow.

To solve these problems, it is then a primary object of the present invention to provide a fluid delivery apparatus with a flow rate sensing means that is able to detect the actually delivered amount of the first fluid in the second fluid. The sensed flow rate is then used in a feedback control to adjust delivery rate in system level.

A further object of the present invention is to provide a fluid delivery apparatus with an evaporation sensing means, which generates sensing values indicative to the evaporation capability of the first fluid in the second fluid. The evaporation sensing values are then used in determining the maximum allowed delivery rate so that only evaporable first fluid can be delivered into the second fluid.

Another object of the present invention is to provide a multifunctional sensing means in a fluid delivery apparatus using the common rail method. The multifunctional sensing means is able to provide the flow rate of the first fluid, evaporation sensing values, and other sensing values including the temperature of the second fluid and the flow rate of the second fluid.

Yet another object of the present invention is to provide a diagnostic means in a fluid delivery apparatus using the information obtained from the multifunctional sensing means and other sensors to monitor the operating status of the fluid delivery apparatus and report faults when an abnormality or an error is detected.

Yet another object of the present invention is to provide a regeneration means for the sensing means in a fluid delivery apparatus. The regeneration means removes the deposit of the first fluid on the sensing means to avoid sensing errors.

BRIEF SUMMARY OF THE INVENTION

The present invention provides a fluid delivery apparatus, which delivers a first fluid into a second fluid, with a multifunctional sensing means that is able to provide information of fluid delivery rate in an apparatus using the pump metering method, and information of fluid delivery rate, flow rate and temperature of the second fluid, and evaporation rate of the first fluid in an apparatus using the common rail method. In an embodiment of the present invention, the fluid delivery apparatus is a reductant delivery apparatus in an exhaust gas treatment system of an internal combustion engine. The reductant delivery apparatus uses the common rail method, in which the average reducant dosing rate is controlled by using a PWM (Pulse Width Modulation) method that generates a pulsated reductant flow by operating an injector on or off. A hot wire sensor which includes a cold wire sensing piece installed upstream of the injector of the reductant delivery apparatus and a hot wire sensing piece positioned in the spray path of the reductant released from the injector. The cold wire sensing piece is used to sense the temperature of exhaust flow and the hot wire sensing piece together with the cold wire sensing piece are used to provide a sensing signal indicative of exhaust flow rate during off-time of the injector. During on-time of the injector the sensing value obtained from the hot wire sensing piece is a function of exhaust flow rate and temperature, reductant evaporating rate, and reductant delivery rate, and in the transition from on-time to off-time, the change in the sensing value is affected by reductant delivery rate, exhaust flow, and exhaust temperature. By using the signals provided by the hot wire and the cold wire sensing pieces, the values of exhaust flow rate, reducant dosing rate that includes both peak dosing rate and average dosing rate, on-time and off-time of the injector, and exhaust temperature, and an evaporation value can be obtained. With the reductant dosing rate value provided by the hot wire sensor, a feedback control can be used to adjust a reductant dosing command generated according to a target value. The evaporation value is indicative of the evaporation capability of the reductant in exhaust flow, therefore, it can be used to determine the maximum allowed dosing rate, so that only the amount of the reductant that is able to evaporate is released to exhaust gas. The values of exhaust flow rate, peak dosing rate, and on-time and off-time of the injector provide information about the components in the exhaust gas treatment system. This information can be used in rationality check for these components, which is required in a diagnostic system such as an OBD (On-Board Diagnostic) system. Additionally, the values of exhaust flow rate and exhaust temperature can also be used in calculating air enthalpy change in an engine, which is then an indication of abnormalities of the exhaust gas treatment system including leakage and mal-position.

In another embodiment of the present invention, the reductant delivery apparatus uses the pump metering method with compressed air assisting reducant delivery. The reductant delivery apparatus includes a mixing chamber in which compressed air mixes with reductant and the result mixture is released to exhaust flow through a nozzle. In this reductant delivery apparatus, a hot wire sensor is able to provide a sensing value indicative of reductant flow rate when the compressed air flow is regulated constant. The hot wire sensor has a cold wire sensing piece positioned in a passage connecting a compressed air source to the mixing chamber, and a hot wire sensing piece in a passage in between the mixing chamber and the nozzle. The sensing value obtained from the hot wire sensor can be used in a feedback control to adjust dosing rate according to a target command value.

Since the hot wire sensing piece exposes to reductant, to avoid issues caused by the reducant deposit on the sensing piece, in the present invention, a regeneration means is also provided. During a regeneration process, the regeneration means heats up the sensing piece to a certain temperature to remove reductant deposit. The regeneration can be triggered periodically with a timer or when sensing values show regeneration is needed, and the hot wire sensing value can be used in a feedback control for adjusting regeneration temperature according to a target value.

BRIEF DESCRIPTION OF THE DRAWINGS

FIG. 6c is a block diagram showing the sub-blocks of the dosing rate calculation and screening block in FIG. 6a.

FIG. 6d is a block diagram showing the sub-blocks of the feedback control block in FIG. 6a.

FIG. 8b is a summary table that lists diagnostic capabilities using signals obtained from a hot wire sensor in a reducant delivery apparatus.

DETAILED DESCRIPTION OF THE INVENTION

Figure 1:
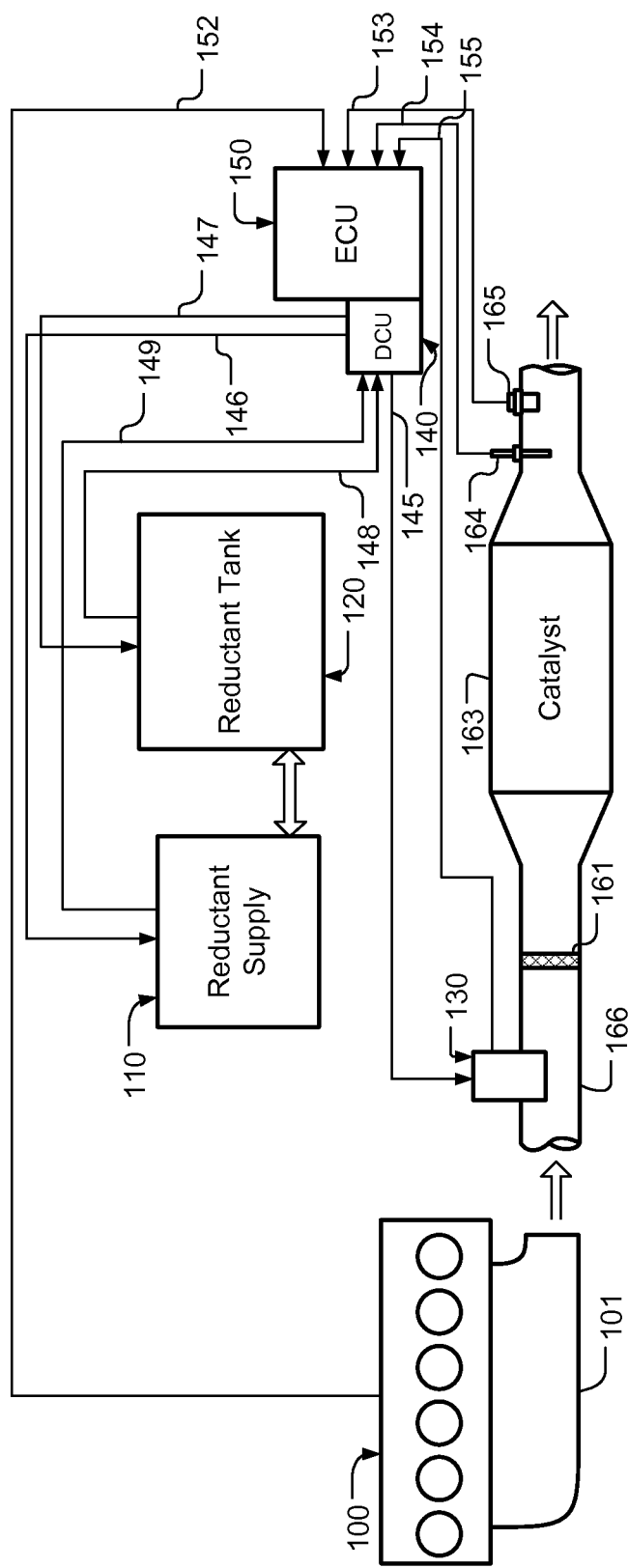
FIG. 1 is a schematic representation of an internal combustion engine with an exhaust gas treatment system.

Referring to FIG. 1, in an engine exhaust gas treatment system, exhaust gas generated by an engine 100 enters a passage 166 through a manifold 101. On the passage 166, a reductant injection module 130 is installed. The injection module 130 is controlled by a DCU (Dosing Control Unit) 140 through signal lines 145 and sensing information obtained from the injection module is sent to an ECU (Engine Control Unit) via signal lines 155. Reductant is supplied to the injection module 130 by a reductant supply module 110, which is controlled by the DCU through signal lines 146, and draws reductant from a tank 120, the heating of which is controlled by the DCU through signal lines 147. Sensing information, such as reductant temperature and pressure, obtained in the reductant supply module is sent to the DCU via signal lines 149, while sensors in the reductant tank, e.g., tank temperature sensors and level sensors, report values to the DCU through signal lines 148. The reductant injected from the injection module 130 mixes with exhaust gas, and through a mixer 161, the result gas enters a catalyst 163, where SCR reactions reduce NOx from the exhaust air. The temperature of exhaust gas downstream the catalyst 163 is measured by a thermistor 164 and the sensing value is provided to the ECU through signal lines 154, while its NOx concentration is monitored by a NOx sensor 165 and the result is sent to the ECU via signal lines 153. Engine information, such as engine state, coolant and oil temperature, engine speed, fueling rate, exhaust flow rate, NOx concentration, and NO2/NOx ratio, are provided to the ECU from sensors in the engine 100 via lines 152, or calculated by the ECU with sensing values obtained from the sensors. In the ECU, dosing commands are generated using temperature sensing values, NOx sensing values, exhaust flow rate, and other engine information, and provided for the DCU to generate commands to the reductant tank 120, the reductant supply module 110, and the reductant injection module 130.

Figure 2A:
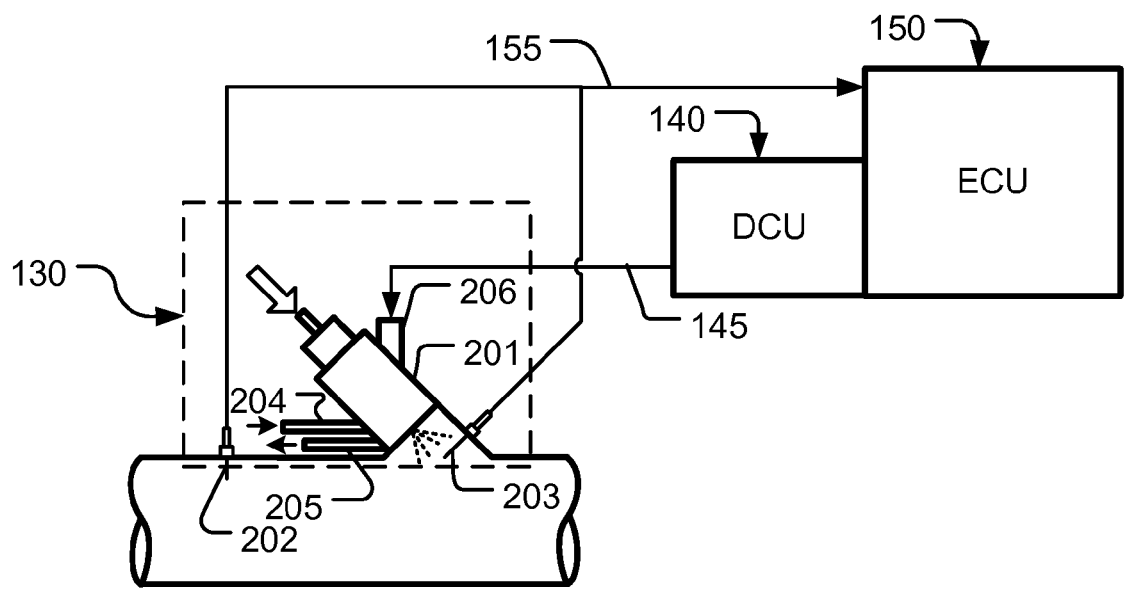
FIG. 2a depicts a reductant delivery apparatus using a common rail method with an injector controlled by a DCU and a hot wire sensor providing sensing values to an ECU.

An embodiment of the reductant injection module 130 in a common rail injection system is shown in FIG. 2a. In this injection module, an injector 201, which is controlled by the DCU through the lines 145 connected to a port 206, is used to inject reductant supplied by the reductant supply module 110 (FIG. 1). Since the injector 201 is in contact with high temperature exhaust flow, to avoid overheating the injector, a coolant cycling loop through ports 204 and 205 is used to carry heat away from the injector. A hot wire sensor including a cold wire sensing piece 202 and a hot wire sensing piece 203 is used for monitoring reductant delivery performance. The cold wire sensing piece 202 is positioned upstream the injector, and the hot wire sensing piece 203 is installed in the spray path of the reductant. The distance between the hot wire sensing piece 203 to the injector nozzle should be long enough to make the sensing values insensitive to reductant temperature. The sensing signals obtained from the hot wire sensor are sent to the ECU through signal lines 155.

Hot wire technology has been broadly used in sensing air flow. In hot wire anemometry, a hot wire sensing piece, which consists of a fine metallic element, is heated by an electrical current. The most common materials used in the metallic element include tungsten, platinum, and a platinum-iridium alloy, the resistance of which changes with temperature. The power that is needed to heat the hot wire sensing piece to a certain temperature is determined by heat transfer rate, which is a function of the velocity, density, and temperature of an air flow in which the sensing piece is positioned. Accordingly by measuring the applied power or voltage to the hot wire sensing piece and its resistance, the air flow rate information can be obtained. In hot wire sensing, commonly used methods includes constant current anemometry (CCA), constant temperature anemometry (CTA), and pulsed wire anemometry (PWA). All these three methods can be used with the present invention. For sake of simplicity, we just use the CTA method in the following embodiment of the present invention.

Figure 3:
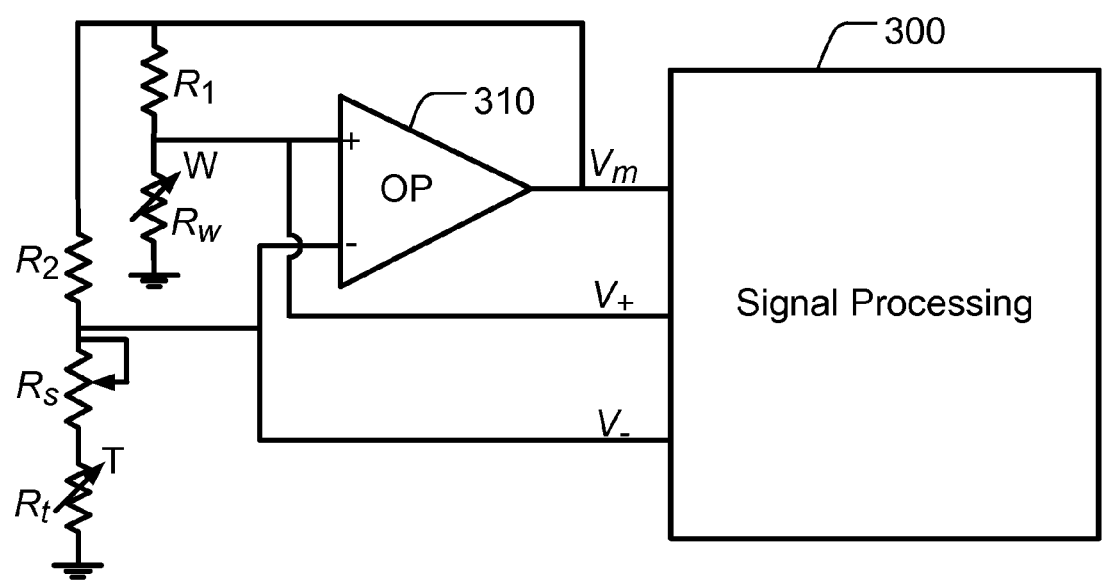
FIG. 3 shows a CTA (Constant Temperautre Anemometer) circuit for hot wire sensors used in the reductant delivery apparatus of the present invention.

Referring to FIG. 3, in which the hot wire sensing piece 203 and cold wire sensing piece 202 are denoted by resistors $R_w$ and $R_t$ respectively in a circuit using the CTA method, one end of the hot wire sensing resistor $R_w$ is connected to an operational amplifier circuit (OP) 310 and a resistor $R_1$, and the other end is grounded. Similarly, one end of the cold wire sensing resistor $R_t$ is connected to a resistor $R_2$ and the OP 310 through a potentiometer $R_s$, while the other end is grounded. The output of the OP 310 is connected to the resistors $R_1$ and $R_2$ and a signal processing module 300. The input signals to the OP 310, $V_+$ and $V_-$, are also sent to the signal processing module 300. In this circuit, the resistance of $R_2$, $R_s$ and $R_t$ are much higher than that of $R_1$ and $R_w$, so that the current in $R_t$ is a small fraction of that in $R_w$ and the self-heating of the thermistor doesn't affect much its temperature sensing accuracy. The OP 310 balances the input voltages $V_+$ and $V_-$ with a feedback of its output voltage, $V_m$, forcing $V_+$ equal to $V_-$, resulting in the following relation between the resistance of $R_w$ and $R_t$:

$$R_w = (R_t + R_s) R_1 / R_2 \qquad (1).$$

In equation (1) and throughout the rest of the specification, we use the same symbol of resistors to denote their resistance.

Since the resistance of $R_t$ is a function of temperature, and the self-heating in $R_t$ is negligible, the resistance of $R_t$ is a function of ambient temperature $T_a$:

$$R_t = f_t(T_a) \qquad (2).$$

Similarly, the resistance of $R_w$ is a function of wire temperature $T_w$:

$$R_w = f_w(T_w) \qquad (3).$$

The applied power to $R_w$ heats up the resistor and exchanges heat with ambient. At equilibrium state, i.e., when the temperature of $R_w$ is steady, the applied power is a function of the difference between the temperatures $T_w$ and $T_a$, and the coefficient of convective heat transfer, h, which is a function of properties of air flow, such as density and velocity. According to equations (1)-(3), if the circuit is balanced, i.e., $V_+$ equals to $V_-$, then the difference between $T_w$ and $T_a$ is independent to air flow. Thereby, in a temperature range in which the coefficient h is not affected much by air flow temperature, flow rate can be calculated just using the output voltage signal $V_m$ of the OP 310.

Figure 4:
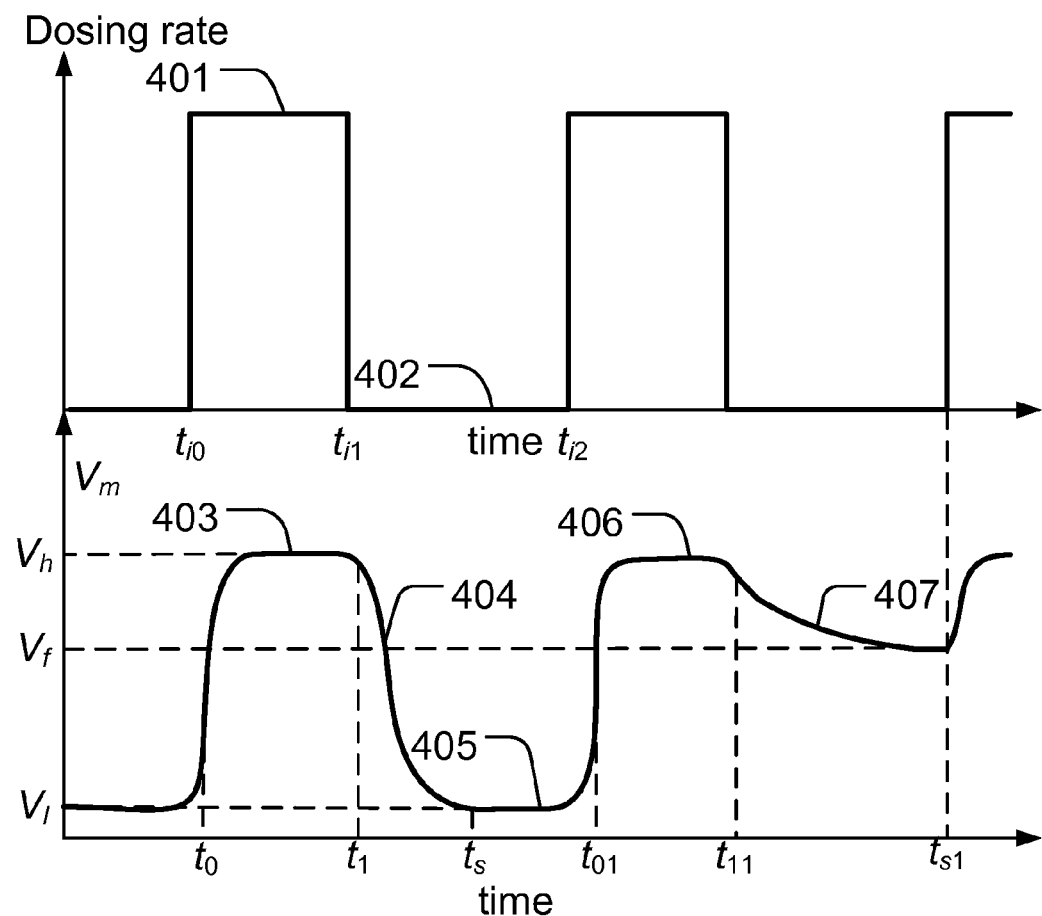
FIG. 4 is a timing chart of reductant dosing rate and sensing signals obtained from a hot wire sensor in a common rail reductant delivery apparatus.

When a hot wire sensor is positioned in a dosing flow as shown in FIG. 2a, the situation is complex. As shown in FIG. 4, since the common rail dosing apparatus uses PWM control, in each PWM cycle, there is an on-time period 401 from a moment $t_{i0}$ to a moment $t_{i1}$ and an off-time period 402 from the moment $t_{i1}$ to a moment $t_{i2}$. During the on-time period, reductant is injected under the pressure in the common rail. The reductant flow passes through the hot wire sensor 203, carrying heat away. At the same time, some dosing droplets stay on the sensor surface, creating heat conduction from the sensor surface to the droplets. The reductant droplets on the sensor surface also evaporate with exhaust gas flow, carrying heat away. All these three factors lower sensor surface temperature, and thereby cause the CTA compensation circuit provide more power to the sensor. As a result, a pulse 403 in the output signal $V_m$ is created from $t_0$ to $t_1$, as depicted in FIG. 4, where $t_0$ to $t_1$ are, respectively, the moments when the pulse 403 starts to rise and fall. In the three factors affecting $V_m$ signal, the amount of heat carried away by the dosing flow and droplets staying on the sensor surface is affected by reductant dosing rate, since the higher the dosing rate, the more heat energy can be carried away from the sensor, and more droplets can impinge on the sensor surface, staying there with heat conduction. The amount of droplets staying on the sensor surface is also affected by evaporation rate, which is further affected by properties of exhaust gas, such as flow rate, temperature, and moisture concentration, since the higher the evaporation rate, with the same amount of impingement and deposition rate, the less the amount of droplets that are able to stay on the sensor. Accordingly, the pulse peak value $V_h$ is a function of reductant dosing rate, evaporation rate of reductant droplets on the sensor surface when the effect of reductant temperature is negligible, and a baseline value $V_l$, which is the value of signal $V_m$ when there is no reductant dosing and thus is a function of exhaust gas properties:

$$V_h = f_p(V_l, E, D_{on}) \qquad (4),$$

where E is the reductant evaporation rate, and $D_{on}$ is the reductant dosing rate during the on-time of the injector. During the off-time, i.e., in the period of 402, the injector is off. Thereby there is no dosing flow carrying heat away from the sensor and no reductant droplets depositing on the sensor surface. The only factor affecting $V_m$ signal other than exhaust gas flow is the evaporation of the reductant on the sensor surface. The evaporation process continues until at a moment $t_s$, when all reductant on the sensor surface evaporates away, thus the time from $t_1$ to $t_s$, $t_e$, is a function of reductant evaporation rate, and according to equation (4), the voltage $V_h$ is a function of $V_l$, $t_e$, and $D_{on}$:

$$V_h = g_p(V_l, t_e, D_{on}) \quad (5).$$

According to equation (5), with the sensing values of $V_l$, $V_h$, and $t_e$, we can calculate the dosing rate $D_{on}$. Furthermore, since the time from $t_0$ to $t_1$, $t_n$, is a function of injector on-time, the average reductant dosing rate, $D_a$, which is determined by the dosing command, can then be calculated using the following equation:

$$D_a = f_d(D_{on}, t_n, t_p) \quad (6),$$

where $t_p$ is the PWM period value.

Note that in equations (4) and (5), during dosing, the voltage $V_l$ may not be always available. When exhaust gas is not able to evaporate reductant during the off-time period, as shown by curves 406 and 407 in FIG. 4, the signal $V_m$ may not be able to drop to its baseline value. In this case, we either need to insert a test cycle with longer off-time, or use a voltage $V_f$, which is the lowest voltage when the next PWM cycle starts. When the voltage $V_f$ is used, according to equation (5), the relation between $V_h$ and $D_{on}$ then becomes:

$$V_h = g_{p2}(V_f, t_f, D_{on}) \quad (7),$$

where $t_f$ is the dosing off time from $t_{11}$ to $t_{s1}$, which are, respectively, the moments when the pulse 407 starts to fall and rise.

Referring back to FIG. 3, when the OP 310 is capable maintaining the balance between $V_+$ and $V_-$, then we have a fixed ratio between $R_w$ and $R_t$, and voltage signal $V_m$ is a function of air flow properties. When the OP 310 is not able to keep $V_+$ equal to $V_-$ due to high heat transfer rate, i.e., the signal $V_m$ is saturated at a constant voltage $V_c$, then $R_w$ may not tie to $R_t$. In this situation, we need to use $V_+$ and $V_-$, together $V_m$ signal in signal processing. As mentioned above, if the OP 310 is able to maintain equivalence between $V_+$ and $V_-$, then the voltage of signal $V_m$ doesn't chance with the difference between the wire temperature $T_w$ and the air flow temperature $T_a$. Therefore, when $V_+$ is no longer equal to $V_-$, we need to use the voltage difference together with the voltage of the signal $V_m$ to compensate for the temperature difference. According to the energy balance equations of CTA hot wire sensors (International Journal of the Physical Science Vol. 6(14), pp. 3270-3278, 18 Jul. 2011), the following equation can be used in the compensation:

$$V'_m = V_m K/\sqrt{T_w - T_a} \quad (8),$$

where $V_m'$ is the compensated voltage; K is a constant. $T_w$ and $T_a$ can be calculated according to equations (3) and (2) respectively, and $R_w$ and $R_a$ are functions of $V_+$, $V_-$, $V_m$, $R_1$ and $R_2$ (FIG. 3):

$$R_w = V_+ R_1/(V_m - V_+) \quad (9)$$

$$R_a = V_- R_2/(V_m - V_-) \quad (10).$$

In FIG. 3, in addition to the heat transfer coefficient of the hot wire sensing piece $R_w$, the voltage $V_m$ is also affected by the changes in resistance $R_w$. To have more accurate sensing values, the $V_m$ signal can further be compensated using the following equation:

$$\tilde{V}_m = V_m \sqrt{R_w}/(R_1 + R_w) \quad (11),$$

where $\tilde{V}_m$ is the compensated signal. The compensation of equation (11) can be applied to all $V_m$ and $V_m'$ signals from which the $V_h$, $V_l$, and $V_f$ values are obtained.

Figure 2B:
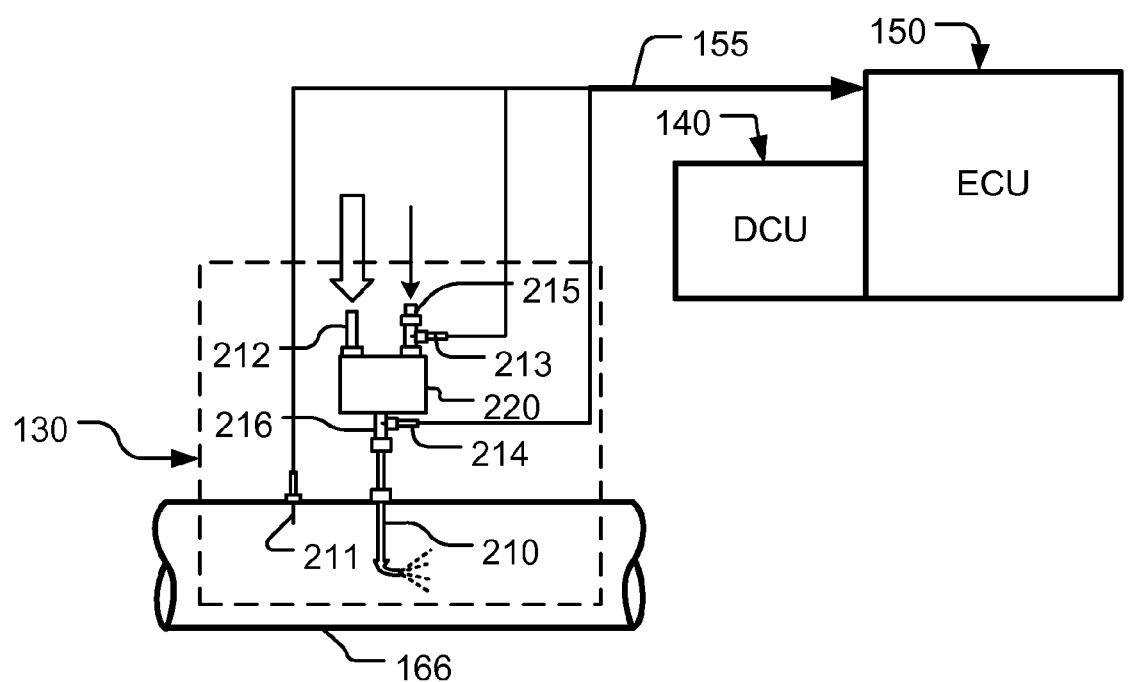
FIG. 2b depicts a reductant delivery apparatus using a pump metering method with a hot wire sensor providing sensing values to an ECU.

In addition to a common rail dosing system, hot wire sensors can also be used in an air assisted dosing system, in which dosing reductant mixes with an air flow and the result flow goes into exhauster chamber through a nozzle. Referring to FIG. 2b, in an air assisted dosing apparatus, reductant is pumped into an inlet of a mixing chamber 220 through a passage 212. The other inlet of the mixing chamber 220 is connected to a compressed air source via a passage 215, on which a cold wire sensing piece 213 is installed and extends into the compressed air flow. Through a passage 216, an outlet of the mixing chamber 220 is connected to a nozzle tube 210, which extends into the exhaust passage 166 and delivers an air-mixed reductant flow into exhaust gas. On the passage 216, a hot wire sensing piece 214 is installed and extends into the air-mixed reductant flow. A thermistor 211 is positioned upstream of the nozzle tube 210, and sensing signals from the thermistor 211 and sensing pieces 214 and 213 are sent to the ECU through signal lines 155.

Figure 5:
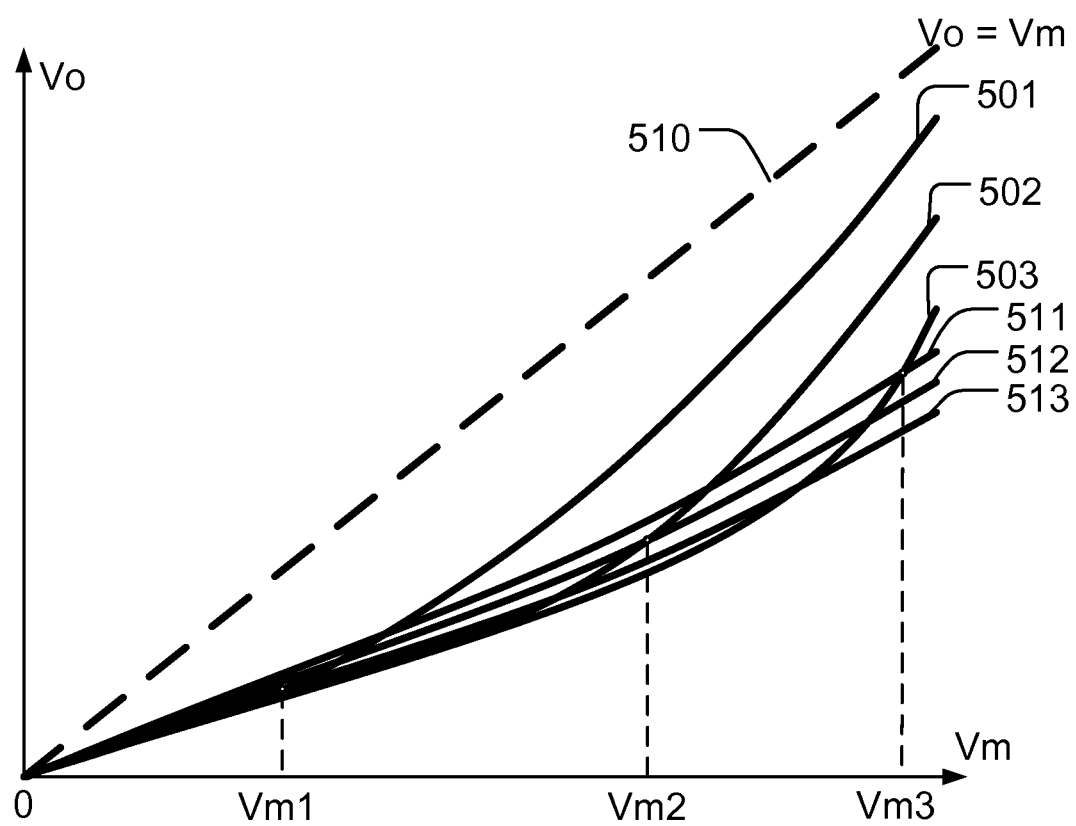
FIG. 5 shows the voltage obtained from a CTA circuit of a hot wire sensor in an air-assisted reductant delivery apparatus.

Similar to the hot wire sensor in a common rail dosing apparatus as depicted in FIG. 2a, a CTA circuit of FIG. 3 can also be used for the hot wire sensor in an air-assisted dosing apparatus of FIG. 2b, except the resistor $R_w$ is the hot wire sensing piece 214, and the resistor $R_t$ is the cold wire sensing piece 213. The cold wire sensing piece 213 is selected less sensitive to resistive heating than the hot wire sensing piece 214, so that a voltage balance can be maintained when the compressed air flow passes by the cold wire sensing piece and the hot wire sensing piece is exposed to the air-mixed reductant flow. The changing curve of the output voltage $V_o$, which is $V_+$ or $V_-$ in FIG. 3, is shown in FIG. 5. Curves 501, 502, and 503 in FIG. 5 are, respectively, the voltage curves of $V_+$ when the hot wire sensing piece 214 is positioned in a mixed flow with reductant dosing rate D1, D2, and D3, and D1<D2<D3. A curve 511 shows the output voltage of $V_-$. Since the cold wire sensing piece 213 is not exposed to the air-mixed reductant flow, the curve 511 doesn't change with dosing rate. A broke line 510 in FIG. 5 is the limit line of $V_o = V_m$, which is approximated by curves 501, 502, 503, and 511 when $V_m$ increases (the voltage $V_m$ is equal to $V_+$ only when the resistor $R_w$ is open, and equal to $V_-$ with an open $R_t$) When dosing rate is at D1, the curve 501 ($V_+$) intersects with the curve 511 ($V_-$) at voltage $V_{m1}$, and the circuit is balanced. The voltage $V_{m1}$ is then indicative to the dosing rate D1. The dosing rate increases to D2, since more heating energy is needed to reach the same resistance, the curve 502 is lower than the curve 501. As a result, only at voltage $V_{m2}$, the circuit can be balanced. Similarly, at dosing rate of D3, the sensor reading becomes $V_{m3}$. Normally in an air-assisted doser, the compressed air flow is regulated at a constant flow rate. Therefore, according to the energy balance equations of the CTA hot wire sensors, since the voltage $V_m$ is mainly affected by the total flow rate of the air-mixed reductant flow, the reductant dosing rate can be obtained. To have a more accurate dosing rate, as mentioned above, equation (11) can also be used to compensate changes in the resistance of $R_w$.

Unlike the hot wire sensor in a common rail dosing apparatus of FIG. 2a, in an air-assisted dosing apparatus, both of the cold wire sensing piece and the hot wire sensing piece are positioned outside exhaust flow. As a result, on one hand, the hot wire sensor in an air-assisted dosing apparatus is not able to provide the flow rate and temperature information of exhaust gas flow. On the other hand, since the dosing rate sensing is not affected by exhaust gas flow, accurate dosing rate measurement is easier to be obtained.

When dosing rate is measured using the hot wire sensor, one immediate application is for compensating dosing rate control. Using the common rail dosing apparatus of FIG. 2a as an example, referring to FIG. 6a, the control system includes a signal processing block 601, a dosing rate calculation and screening block 602, and a feedback control block 603. In the signal processing block 601, the voltages $V_h$, $V_l$, and $V_f$, the pulse width $t_n$, the PWM period $t_p$, and the evaporation time $t_e$ together with a status value Te_status, are obtained with inputs signals $V_m$, $V_+$, and $V_-$. Then in calculating the average dosing rate $D_{as}$ in the dosing rate calculation and screening block 602, these parameters are used together with the dosing command and signal status, which includes the validity flags of signals $V_+$, $V_-$, $V_m$, and signals upon which the dosing command is calculated. In the feedback control block 603, the dosing rate provided by the signal screening block is compared with the dosing command, and the difference in between these two values are used in correcting dosing control.

Figure 6A:
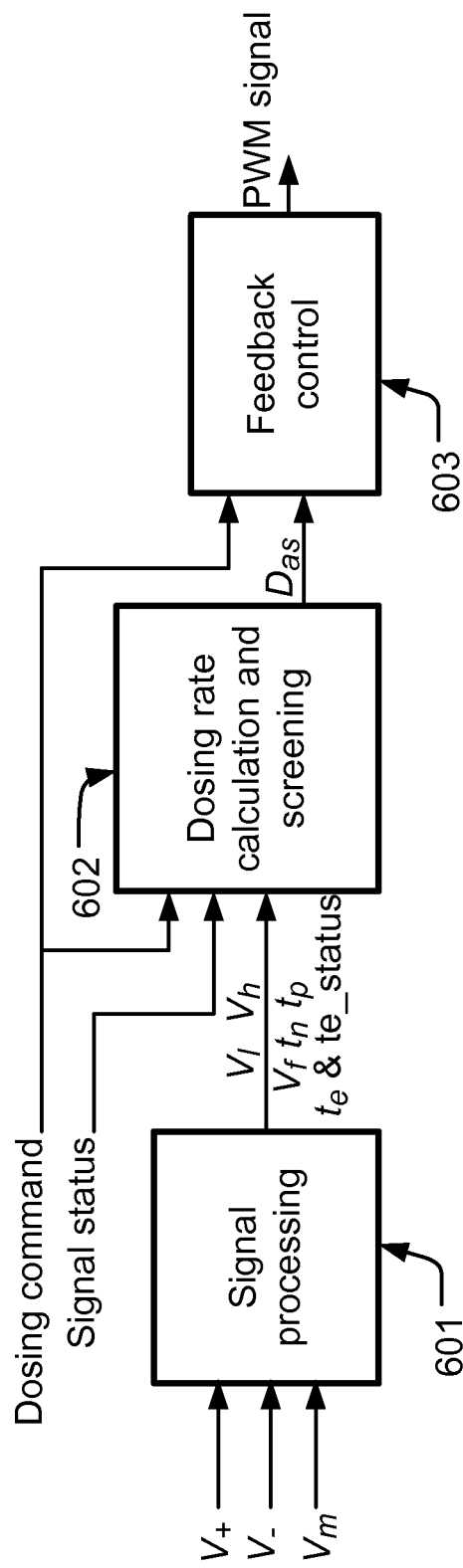
FIG. 6a is a block diagram of a feedback control system for a common rail fluid delivery apparatus, which obtains sensing information from a hot wire sensor.
Figure 6B:
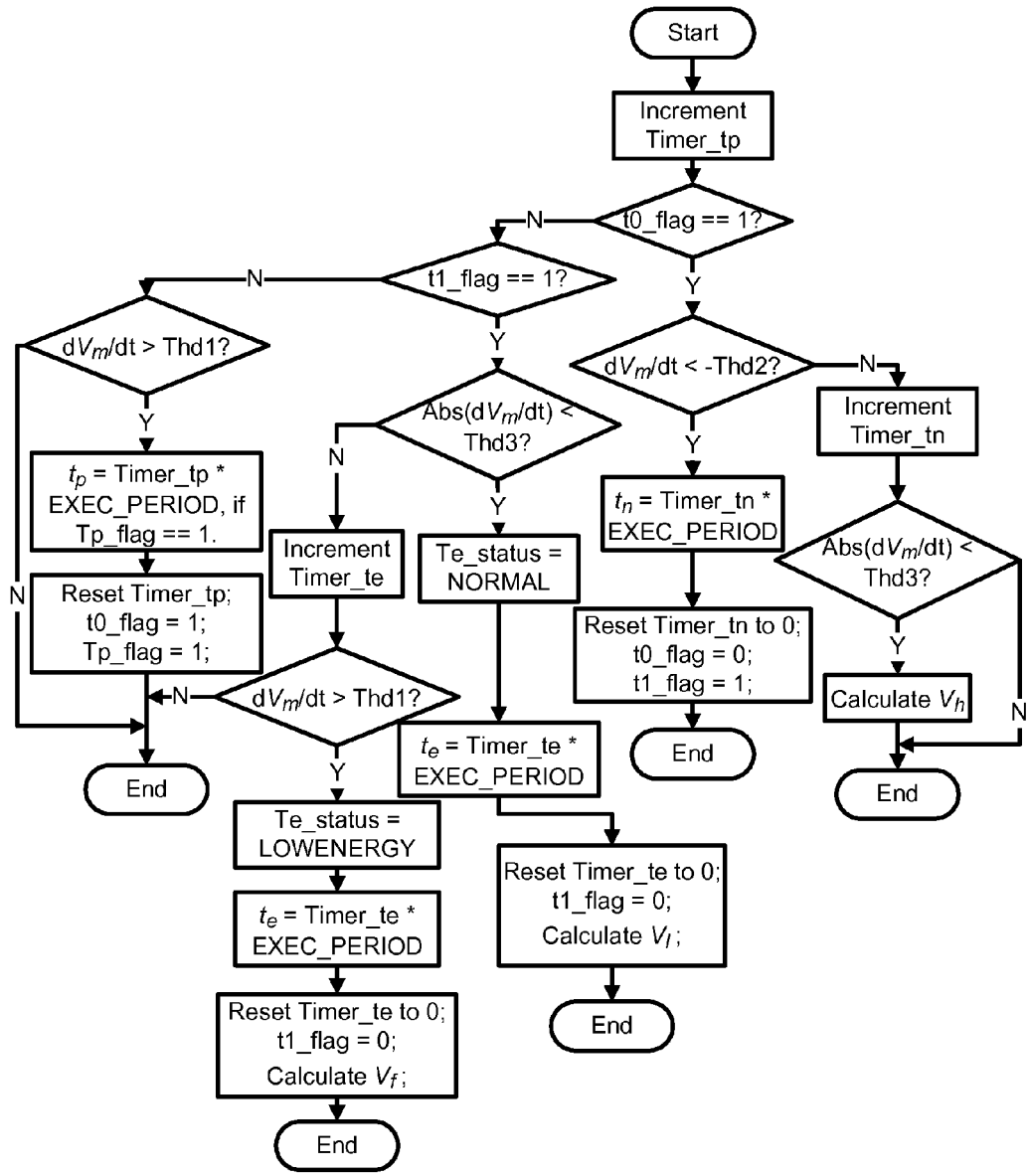
FIG. 6b is a flow chart of a service routine running periodically for a timer based interrupt for processing sensing signals obtained from a hot wire sensor in a fluid delivery apparatus using a common rail method.

In an embodiment of the signal processing block 601, an interrupt service routine running periodically with a period of EXEC_PERIOD, as shown in FIG. 6b, is used in calculating parameters. Referring to FIG. 6b, after the routine starts, a timer counter Timer_tp is incremented. Then a flag t0_flag is examined. If it is not 1, then a flag t1_flag is examined. If the t1_flag is not 1 either, then the changing rate of $V_m$ signal, $dV_m/dt$, is compared to a threshold value Thd1, if it is lower or equal to the threshold, the routine ends, otherwise, a rising edge of the signal $V_m$ is detected, and when Tp_flag is 1, which means it is not the first time the rising edge is detected, the PWM period is calculated and assigned to the variable $t_p$. The routine resets the counter Timer_tp, and sets the flags t0_flag and Tp_flag to 1 before it ends. Going back to the examination of the flag f1_flag, if the flag value equals to 1, then the absolute value of the changing rate $dV_m/dt$ is compared to a threshold value Thd3, if it is lower than this threshold, then the signal $V_m$ goes steady. The value from a timer counter Timer_te is used to calculate the evaporation time $t_e$, and the status of the $t_e$ value, Te_status, is set to NORMAL. The routine then resets the counter Timer_te and the flag t1_flag to 0, and calculates the steady voltage value $V_l$ before it ends. When the absolute value of the changing rate $dV_m/dt$ is not lower than the threshold Thd3, the counter Timer_te is incremented, and upon the next rising edge of the $V_m$ signal, i.e., when the changing rate $dV_m/dt$ is higher than the threshold Thd1, as mentioned above (curve 407 in FIG. 4), the exhaust energy is not enough to evaporate reductant on the hot wire sensing piece before the next PWM cycle starts. In this case, a status LOWENERGY is assigned to the variable Te_status, and the evaporation time $t_e$ is calculated with the value in the counter Timer_te. The counter Timer_te and the flag t1_flag are reset to 0 thereafter, and the routine ends after the voltage $V_f$ is calculated. Referring back to the examination of the flag t0_flag, if the flag value is 1, then the changing rate $dV_m/dt$ is compared to a negative threshold value –Thd2. If it is lower than this value, it means a falling edge of the signal $V_m$ is detected. The PWM on-time $t_n$ is then calculated using the value in the counter Timer_tn, and the routine sets the flag t1_flag to 1 and resets the counter Timer_tn and the flag t0_flag to 0 before it ends. If the changing rate $dV_m/dt$ is higher than the threshold value –Thd2, then the counter Timer_tn is incremented, and the absolute value of the changing rate $dV_m/dt$ is compared to the threshold value Thd3 to examine the stability of the signal. If the absolute changing rate value is higher or equal to the threshold, then the routine ends, otherwise, the voltage $V_h$ is calculated before the routine ends. In calculating the voltages $V_l$, $V_h$, and $V_f$, the compensation methods according to equations (2), (3), (8), (9), (10) and (11) can be used.

Figure 6C:
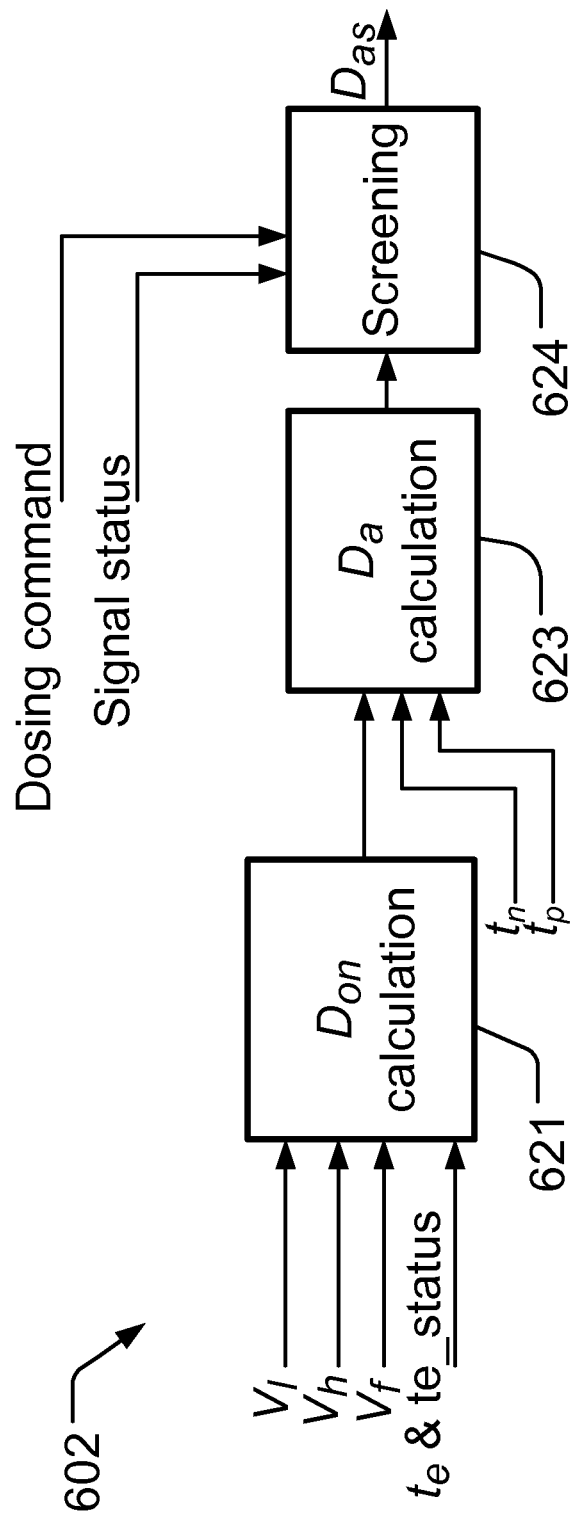

The signals $V_l$, $V_h$, $V_f$, $t_n$, $t_p$, $t_e$ and Te_status are then sent to the dosing rate calculation and screening block 602 for calculating the dosing rate $D_{as}$. In an embodiment of the block 602, referring to FIG. 6c, the signals $V_l$, $V_h$, $V_f$, $t_e$, and Te_status are used to calculate the on-time dosing rate $D_{on}$ in a sub-block 621, according to equations (5) or (7). When using equation (7), the value of $t_f$ is that of $t_e$ when te_status is LOWENERGY. Then according to equation (6), with inputs of $t_n$, $D_{on}$, and $t_p$, the average dosing rate $D_a$ is calculated in a block 623. The dosing rate $D_{as}$ used in feed-back control is then calculated using $D_a$ with screening conditions that check the signal status and dosing command values in a block 624. The signal screening only allows the dosing rate $D_{as}$ equal to $D_a$ when the signals $V_l$, $V_h$, $V_f$, $t_e$, te_status, $t_n$, $t_p$, and the signals upon which the dosing command is calculated are valid, and the dosing command is within a pre-determined range. If the signal status shows these signals are not valid or the dosing command is out of the range, then $D_{as}$ equals to the dosing command. The signal screening is to avoid invalid signals or too small or too large dosing commands cause invalid or poor dosing rate detection that may cause issues in dosing controls.

Figure 6D:
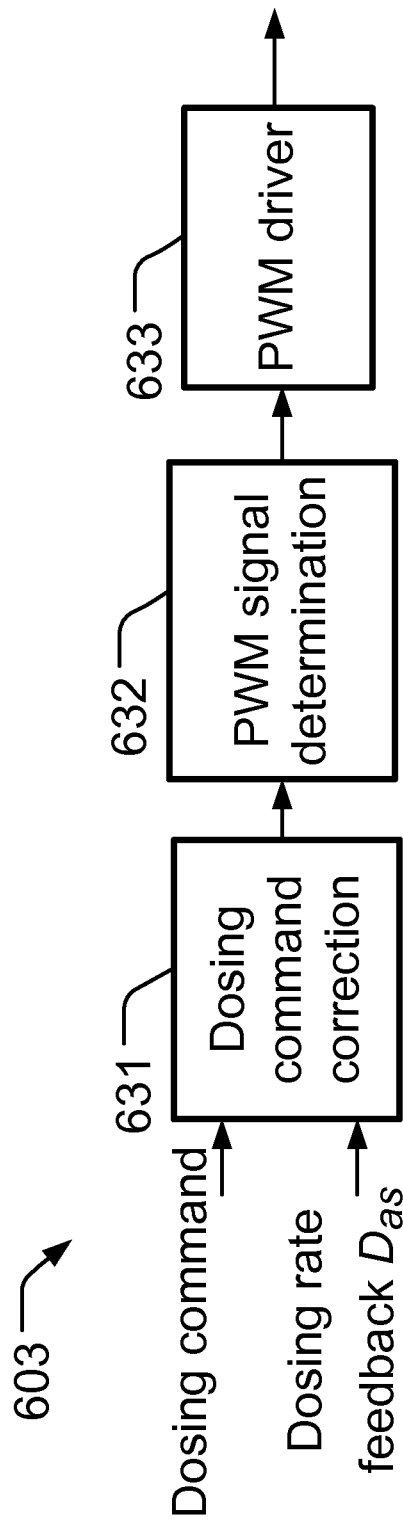

The measured dosing rate $D_{as}$ is then fed into a feedback control loop for adjusting PWM control commands. Referring to FIG. 6d, in an embodiment of the feedback control block 603, the dosing command and the dosing rate $D_{as}$ are compared in a dosing command correction sub-block 631, and the difference is used in correcting the commands to a PWM signal determination sub-block 632. The result PWM signal drives the injector solenoid valve in the injector 201 (FIG. 2a) through a PWM driver 633.

In addition to controlling the PWM signal, in a common rail dosing apparatus, the dosing rate can also be controlled by adjusting the reductant pressure in the common rail. The pressure adjustment can be used together with the PWM control. It is especially useful when the PWM signal reaches its limits. However, since the reductant pressure also affects atomization, the pressure adjustment should be limited to a certain range.

In an actual control algorithm, a variety of methods can be used in the calculations according to equations (2)-(11) in the embodiment of FIG. 6a. A simple method is a lookup table method, in which the lookup table values can be populated with the results obtained from a matrix test with multiple exhaust flow rate, temperature, and dosing rate settings. In the feedback control, dosing errors are mainly caused by changes in pressure sensing accuracy, nozzle orifice size, and solenoid response. Both of a slow deterioration during system operation and part-to-part variations in the system could cause these changes. For the slow deterioration, to decrease noise effects, a slow filter can be used in calculating PWM commands (e.g. in the dosing command correction sub-block 631 of FIG. 6d), while a faster filter is able to quickly adjust dosing errors caused by the part-to-part variation during in-plant calibration or in re-calibration when a doser is replaced, and a control logic can be used in switching the filters.

Figure 7A:
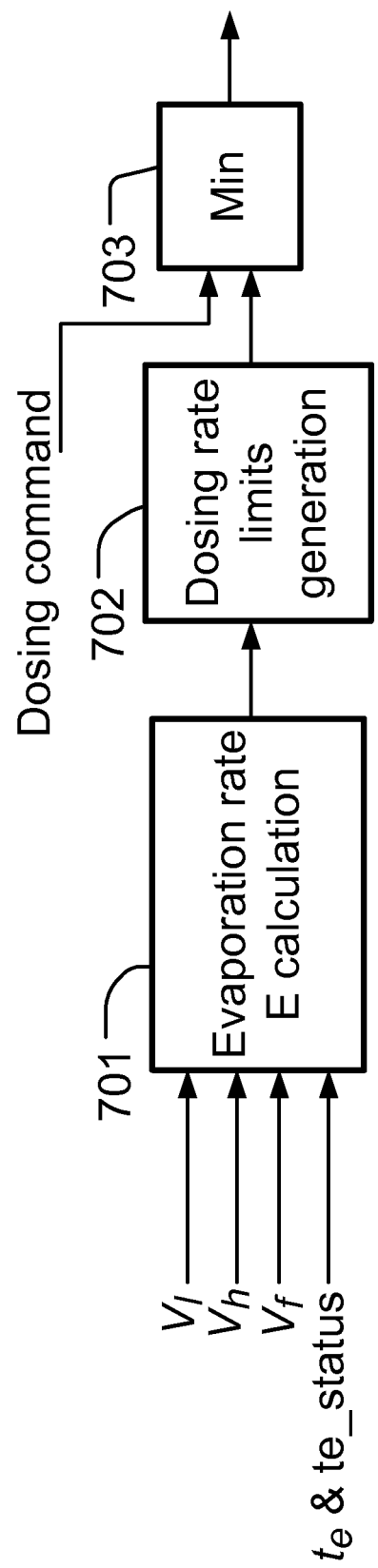
FIG. 7a is a block diagram of a controller that limits reductant dosing rate with an evaporation value obtained from a hot wire sensor in a reductant delivery apparatus using a common rail method.

Signals obtained from the hot wire sensor also provide information about reductant evaporation. According to equations (4) and (5), the evaporation rate E can be determined by $V_h$, $V_l$, and $t_e$. The evaporation rate is mainly affected by exhaust flow rate, temperature, and moisture, which is further a function of engine air-to-fuel ratio and ambient humidity. In SCR control, since normally the exhaust gas passage from the doser to the catalyst is not large enough to avoid impingement of dosing droplets, when evaporation rate is low, as that on the surface of the hot wire sensing piece, the un-evaporated reductant may polymerize, forming solid deposit, which needs a high temperature to decompose and may block dosing or even increase back pressure if it grows too large. To avoid the reductant deposit issues, one method is to decrease dosing rate when the reductant evaporation rate is low, i.e., using the evaporation rate to generate a limit for dosing commands. An algorithm using the measured evaporation rate E to generate dosing limit is shown in FIG. 7a. In this algorithm, the evaporation rate E is calculated in a block 701 with inputs of $V_l$, $V_h$, $V_f$, $t_e$, and Te_status according to equations (4), (5), and (7). Then dosing rate limit values are calculated in a block 702 based on the evaporation rate E. The dosing command is then compared with the dosing rate limit values in a block 703, and the lower value in these two is output to doser control (not shown in FIG. 7) for controlling the injector solenoid. In the block 702, a lookup table can be used in the calculation, and the input to the lookup table can be a voltage changing rate $E_r$, calculated using $$E_r = (V_h - V_l)/te \quad (12),$$

if Te_status is NORMAL, or $$E_r = (V_h - V_f)/te \quad (13),$$

if te_status is LOWENERGY. A simpler calculation is just output $E_r$ to the block 702 calculating dosing rate limits directly.

Figure 7B:
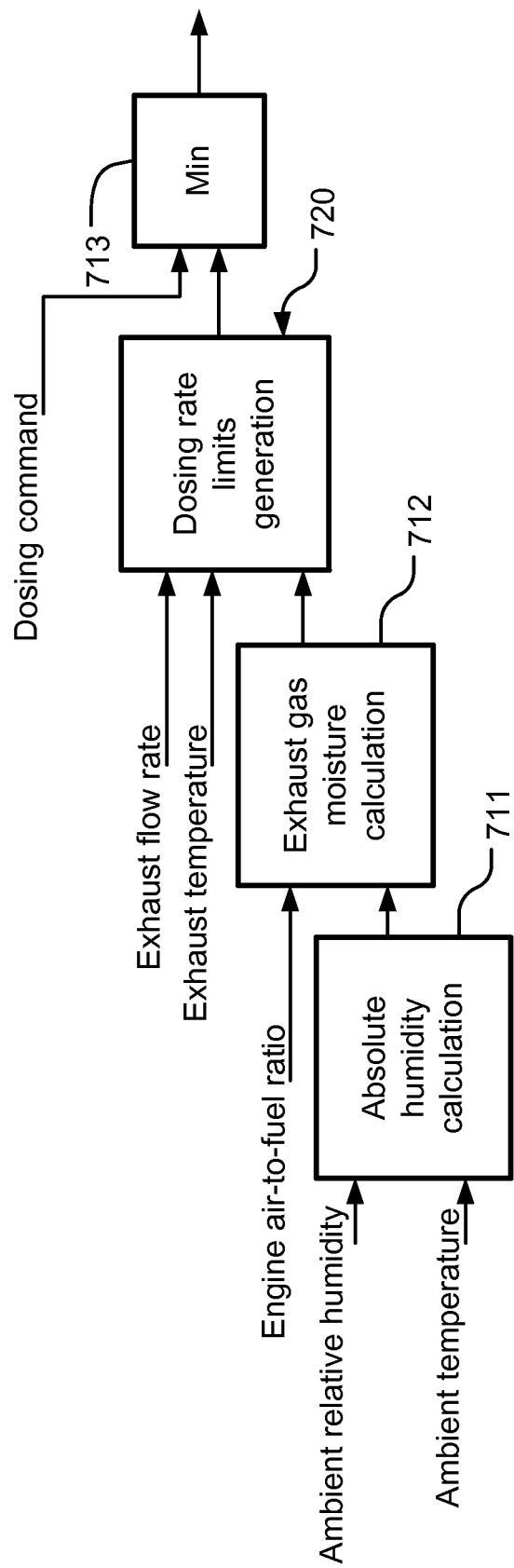
FIG. 7b is a block diagram of a controller that limits reductant dosing rate with an evaporation value calculated using sensing information independent to reductant dosing.
Figure 7C:
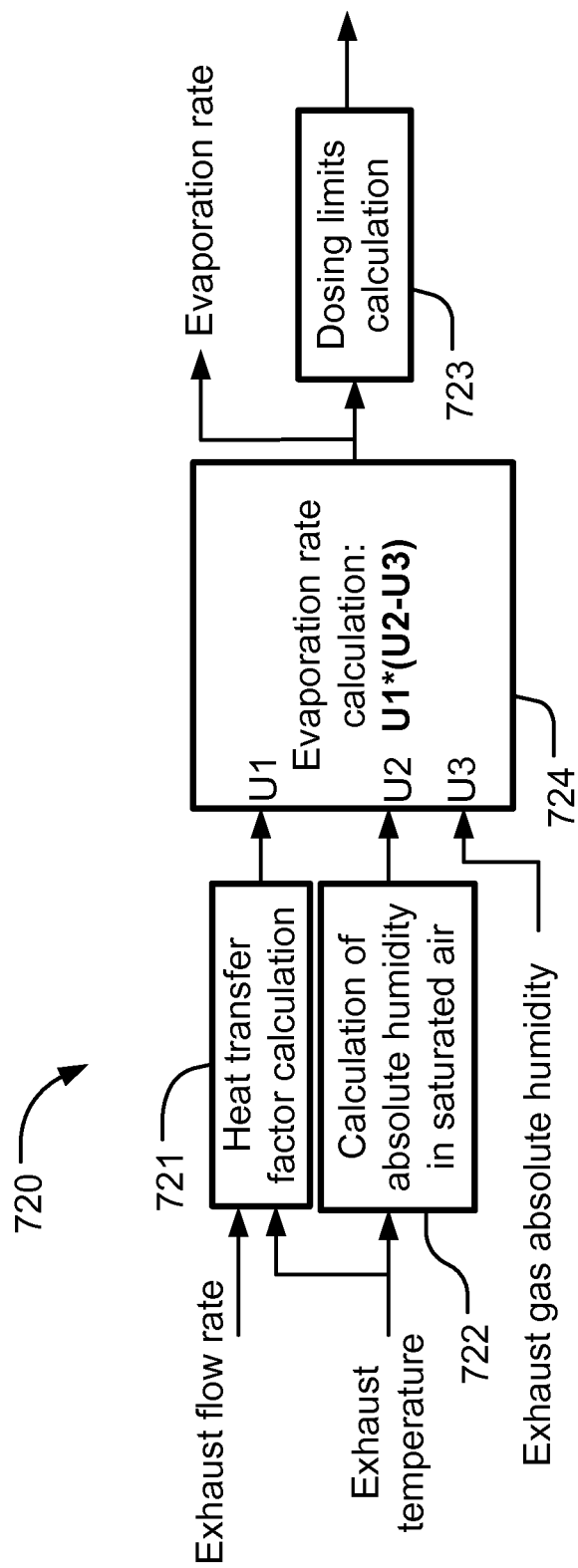
FIG. 7c is a block diagram showing the sub-blocks of the dosing rate limits generation block in FIG. 7b.

Like that in dosing rate measurement, when dosing rate is too low or too high, the measurement accuracy of the evaporation rate may be affected. As a result, the dosing rate limit values calculated in the block 702 have to be limited to certain range. To have a broader limit range, an algorithm as shown in FIG. 7b can be used to generate dosing limits using exhaust flow rate, temperature, air-fuel ratio, and ambient humidity. Referring to FIG. 7b, an absolute ambient humidity is calculated in a block 711 with inputs of ambient temperature and relative humidity sensing values. Then the ambient humidity together with the engine air-to-fuel ratio is used to calculate exhaust gas moisture in a block 712. The calculations in the blocks 711 and 712 are well known and won't be repeated here. The calculated exhaust gas moisture together with the exhaust flow rate and temperature are used in calculating dosing rate limits in a block 720, and the result values are used in limiting the dosing command in a block 713 through a "Min" calculation, which outputs the lower value of the inputs. A variety of methods can be used in calculating dosing limits in the block 720. In an example shown in FIG. 7c, an evaporation factor is calculated with the exhaust flow rate and the exhaust temperature in a sub-block 721, and the absolute humidity in saturated air is calculated in a sub-block 722. In a sub-block 724, an evaporation rate value is calculated using an equation:

Evaporate rate=Evaporation factor*(Absolute humidity in saturated air−Exhaust gas absolute humidity)   (14), where the Exhaust gas absolute humidity is the output of the block 712 in FIG. 7b. The evaporation rate is then used for calculating dosing limits in a sub-block 723. The evaporation rate can be calibrated to the evaporation E using the hot wire sensor. In the calibration, since the calculation in the sub-block 722 doesn't need calibration, the parameters need to be calibrated are that in the sub-block 721 for calculating the Evaporation factor. A lookup table can be used in the calculation. Also, since the algorithm of FIG. 7b needs not to detect dosing rate, it is not limited by dosing. As a result, the algorithm of FIG. 7b can either be used to cover too-low or too-high dosing rates for the algorithm of FIG. 7a, or used independently in providing dosing limits.

Figure 8A:
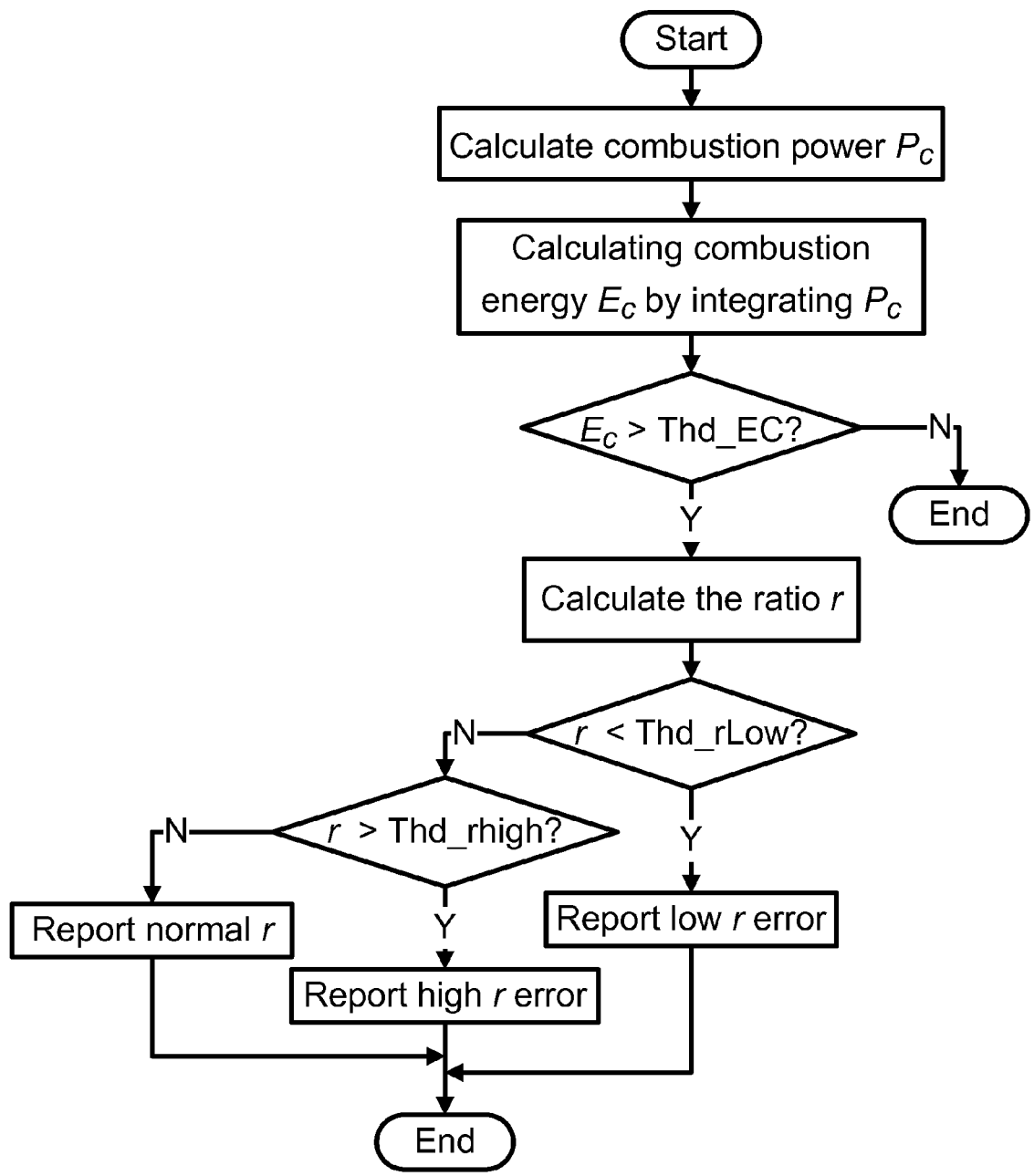
FIG. 8a is a flow chart of a service routine used in a diagnostic system of an exhaust gas treatment system running periodically for a timer based interrupt and reporting faults when the exhaust gas treatment system leaks or the reductant delivery apparatus of the exhaust gas treatment system is not positioned in exhaust flow.

In addition to detecting reductant dosing rate, the information provided by the hot wire sensor of FIG. 2a can also be used in checking system integrity. In the hot wire sensor, referring to FIG. 2a and FIG. 3, the voltage $V_-$, which is determined by the resistance of the thermistor 202, carries information of the exhaust temperature $T_{exh}$, and as mentioned above, the voltage $V_l$ is an indication of the exhaust flow rate $\dot{m}_e$. Since the enthalpy change of air passing through the engine, which is calculated using the exhaust temperature, exhaust flow rate, fresh air temperature, and fresh air flow rate, is a fraction of the total amount of energy released by burning fuel, if the ratio of the enthalpy change to the combustion energy is too small, then there could be an exhaust leakage, a fueling issue (e.g. a fuel injector is stuck closed), a sensor problem, or the dosing system is not well positioned in the exhaust flow. On the other hand, if the ratio value is too large, then there could be a sensor issue, a fueling problem (e.g. a fuel injector is stuck open), or problems in the cooling system or the air handing system of the engine. The following equations together with equations (9) and (10) can be used in the calculation of the ratio:

$$T_{exh} = f_t(R_a) \quad (15)$$

$$\dot{m}_{exh} = f_m(V_l, R_w) \quad (16)$$

$$P_c = \dot{m}_f LHV \quad (17)$$

$$r = [\dot{m}_e C_{p1} T_{exh} - (\dot{m}_e - \dot{m}_f) C_{p1} T_{amb}]/P_c \quad (18),$$

where $C_{p1}$ is a factor determined by the constant pressure heat capacity of exhaust flow and fresh air flow; $T_{amb}$ is the ambient temperature; r is the ratio between the enthalpy change and the combustion energy; $\dot{m}_f$ is the fueling rate, and LHV is the low heating value of the fuel. Normally, since the fueling rate $\dot{m}_f$ is only a small fraction of the exhaust flow rate $\dot{m}_e$, equation (18) can be further simplified as $$r = A_F(T_{exh} - T_{amb}) C_{p1}/LHV \quad (19),$$

where $A_F$ is the air-fuel ratio of engine combustion. A flow chart of an interrupt service routine for checking system rationality using the ratio r is depicted in FIG. 8a. A timer-based interrupt can be used to periodically trigger this routine. Referring to FIG. 8a, the routine starts with calculating the combustion power $E_c$. When it is higher than a threshold Thd_EC, then the ratio r is calculated and compared to two thresholds Thd_rLow, and Thd_rHigh, otherwise, the routine ends. If the ratio r value is lower than the threshold Thd_rLow or higher than the threshold Thd_rHigh, then corresponding faults are reported, otherwise, a normal status is reported. The routine ends thereafter. In this algorithm, the check for the minimum combustion energy is to avoid false detections caused by the energy loss due to heat transfer.

Furthermore, the information obtained from the hot wire sensor can be used for checking rationality of the exhaust flow rate sensor, and diagnose issues in the dosing system including that in the common rail pressure control loop, the injector nozzle orifice, and the injector solenoid control of a common rail dosing system, and in the dosing pump control loop of an air-assisted system. In checking the rationality of the exhaust flow rate sensor, a flow rate calculated according to equations (9) and (16) can be compared with the exhaust flow sensor reading. If the difference is out of a range, then a fault is triggered.

In a common rail dosing system, the dosing rate during the on-time of a PWM pulse, $D_{on}$, is a function of common rail pressure and injector nozzle orifice size:

$$D_{on} = C_d A \sqrt{2\rho(P_r - P_e)} \qquad (20),$$

where $C_d$ is the coefficient of discharge; A is the injector orifice area; $\rho$ is the reductant density; $P_r$ is the common rail pressure, and $P_e$ is the pressure in the exhaust pipe, into which the reductant is injected. Accordingly, by comparing the results calculated using equation (20) and the measured value obtained with equations (5) or (7), issues in common rail pressure sensing and the injector nozzle can be detected. Additionally, since normally change in the injector nozzle is very slow compared to that in common rail pressure, faults can be further isolated by using the difference between the changing rates of the measured and calculated values of $D_{on}$.

As mentioned previously, the detected PWM on-time $T_{on}$ is affected by the response time of the injector solenoid control. Thereby by comparing the measured $T_{on}$ with the $T_{on}$ command, issues in injector solenoid control can be detected. Some issues in injector solenoid control, such as low control voltage, or driver failures (e.g. open circuit, short to voltage supply, and short to ground) can be detected by monitoring driving current. However, injector issues, such as stuck-open or stuck-closed don't have driving current problems. The method using the detected on-time $T_{on}$ is able to cover all these problems.

In an air-assisted dosing system, normally reductant dosing rate is determined by pumping rate. Therefore, by comparing the detected dosing rate to the dosing command, issues in pumping control can be detected. Compared to some methods in which motor speed is monitored for detecting motor control problems and driver issues, the method of detecting reductant flow rate is able to cover more issues including that in the pump and delivery passages, e.g. problems of the pump membrane and the check valves, and that in the pressure line connecting the pump to the mixing chamber. A summary of the diagnostic capabilities is shown in FIG. 8b.

Figure 9:
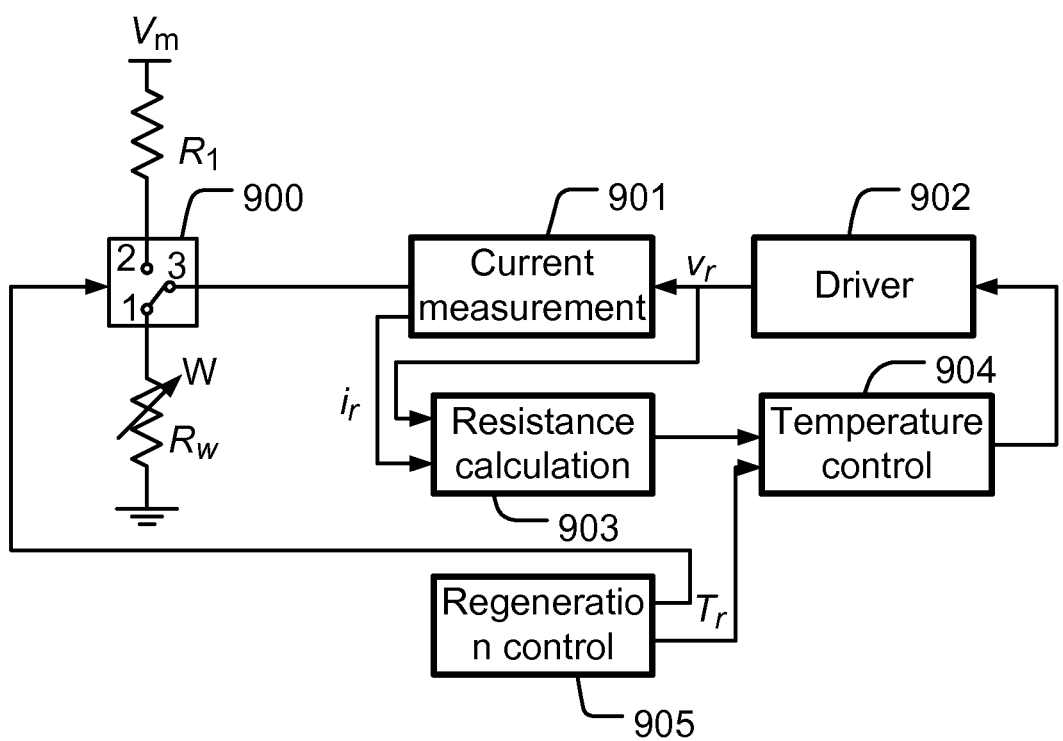
FIG. 9 is a circuit and block diagram of a controller for heating the hot wire sensing piece of a hot wire sensor in a fluid delivery apparatus.

As depicted in FIGS. 2a and 2b, the hot wire sensing piece needs to be positioned in reductant dosing flow. In applications with high exhaust gas energy, e.g. in applications with high engine speed and torque, or periodically high exhaust temperature being generated, e.g. in a system with a DPF (Diesel Particulate Filter) installed upstream of the sensor and the DPF is regenerated periodically, reductant deposit is not a concern. However, in applications with low exhaust gas energy, reductant may deposit on the surface of the sensing piece and polymerize, causing sensing errors. To remove the polymerized reductant, the sensing piece needs to be heated to a certain temperature. And since the sensing piece is resistive and its resistance changes with temperature, the sensing piece can be heated with an applied heating voltage with heating temperature being monitored by measuring the resistance of the sensing piece. A heating circuit for the hot wire sensing piece is shown in FIG. 9, in which a switch 900 controlled by a regeneration control block 905 is used to switch the applied voltage to the hot wire sensing resistor $R_w$. When a regeneration event is triggered, the switch 900 disconnects pin 1 from pin 2 and connects it to pin 3. Through the switch 900, a heating voltage $V_r$ is applied to the resistor $R_w$ via a current measurement circuit 901, in which the applied current $i_r$ is measured and the sensing value is provided to a resistance calculation block 903. With the value of the applied heating voltage $V_r$ and the applied current $i_r$, the resistance of the resistor $R_w$ is calculated and sent to a temperature control block 904, where the resistance is converted to temperature and compared with a target temperature $T_r$ provided by the regeneration block 905. The difference between the measured temperature and the target value is then used in generating a control signal for a driver circuit 902, where the heating voltage signal $V_r$ is generated based on the control signal. During regeneration, the temperature of the resistor $R_w$ is controlled to a certain level to effectively remove polymerized reductant and at the same time, avoid the sensing piece from being damaged by over-heating.

The regeneration of the sensing piece can be triggered periodically or using the sensing values obtained from the hot wire sensor. In a periodical regeneration, the time interval between two regenerations should be set to prevent reductant deposit from accumulating to a level affecting sensing accuracy, while in regenerations triggered using sensing values, a regeneration is only triggered when sensing accuracy is affected. An example of periodical regeneration is using a timer to count the lapsed time since last regeneration. If the lapsed time equals to a pre-determined time interval value, then a regeneration is triggered and the timer is reset for the next regeneration when the current regeneration completes. In triggering regenerations using sensing values, a status of a sensing value that is indicative to issues in the sensing accuracy needs to be used. For example, in a common rail dosing control apparatus of FIG. 2a, the status of $t_e$, te_status (FIG. 6b), can be used in triggering regeneration. A simple algorithm could be triggering a regeneration when the value LOWENERGY is set to te_status continuously for a pre-determined period of time.

In addition to removing reductant deposits for accurate sensing, regenerations can also be triggered to confirm a fault. For example, in an air assisted dosing apparatus of FIG. 2b, when a low dosing rate is detected, before triggering a fault, a regeneration can be triggered, and a fault is generated only when the low dosing rate is detected again after regeneration. Furthermore, since the deposit on the hot wire sensing piece is an indication of low exhaust flow energy, which also affects reductant deposition in the exhaust gas treatment system in which the hot wire sensor is installed, when a heating means is available for helping removing reductant deposit in exhaust gas treatment system, the sensing values for triggering regeneration can also be used for controlling the heating means. For example, in an exhaust gas treatment system with a DPF installed upstream from a reductant delivery apparatus, with which the hot wire sensor is installed, when a sensor regeneration is triggered, a DPF regeneration can be triggered as well to remove reductant deposits in the exhaust gas treatment system.

While the present invention has been depicted and described with reference to only a limited number of particular preferred embodiments, as will be understood by those of skill in the art, changes, modifications, and equivalents in form and function may be made to the invention without departing from the essential characteristics thereof. Accordingly, the invention is intended to be only limited by the spirit and scope as defined in the appended claims, giving full cognizance to equivalents in all respects.

What is claimed is:

1. A fluid delivery apparatus for delivering a first fluid into a flow of a second fluid, comprising:
   a buffer chamber containing said first fluid;
   an injector for releasing said first fluid into said second fluid having a nozzle fluidly connected to said second fluid and a solenoid valve for controlling a flow of said first fluid;

a pressure controller configured to control a pressure of said first fluid in said buffer chamber;
an injection controller configured to energize said solenoid valve open and de-energize said solenoid valve closed; and
a sensing means including a first sensing piece positioned in said second fluid upstream from said injector generating a first sensing signal and a second sensing piece positioned in a spray path of said first fluid downstream from said nozzle contacting said first fluid when sprayed through said nozzle and generating a second sensing signal, wherein said sensing means is adapted to provide a first sensing value indicative of a flow rate of said first fluid in response to at least said first sensing signal and said second sensing signal, and said injection controller is adapted to control an average flow rate of said first fluid by controlling a ratio of an open time, during which said solenoid valve is energized open, to a close time, during which said solenoid valve is de-energized closed, in response to a predetermined injection rate value.

2. The fluid delivery apparatus of claim 1, wherein said first sensing signal is indicative of a temperature of said second fluid and said second sensing signal is indicative of a flow rate and a temperature of a fluid flow at a location adjacent to said second sensing piece.

3. The fluid delivery apparatus of claim 2, wherein said sensing means is configured to provide a first flow rate value when said solenoid valve is de-energized closed, and a second flow rate value when said solenoid valve is energized open, in response to at least said first sensing signal and said second sensing signal, and further configured to provide a second sensing value indicative of a flow rate of said second fluid, and a third sensing value indicative of said open time in response to at least said first flow rate value and said second flow rate value.

4. The fluid delivery apparatus of claim 1, wherein said pressure controller is further configured to adjust said pressure of said first fluid in response to at least said first sensing value.

5. The fluid delivery apparatus of claim 3, wherein said injection controller is further configured to adjust said ratio of said open time to said close time in response to at least said third sensing value.

6. The fluid delivery apparatus of claim 1, wherein said injection controller is further configured to adjust said ratio of said open time to said close time of said solenoid valve in response to at least said first sensing value.

7. The fluid delivery apparatus of claim 2, wherein said first fluid is a liquid solution and said second fluid is gaseous, and said second sensing piece further generates a third sensing signal indicative of an evaporation rate of said first fluid in said second fluid.

8. The fluid delivery apparatus of claim 7, wherein said sensing means is further configured to provide an evaporation sensing value indicative of said evaporation rate in response to at least said third sensing signal, and said injection controller is further configured to limit said ratio of said open time to said close time to a predetermined maximum value in response to at least said evaporation sensing value.

9. The fluid delivery apparatus of claim 1, further comprising:
a heating means for raising a temperature of said second sensing piece above a predetermined value range to remove deposits on said second sensing piece.

10. The fluid delivery apparatus of claim 9, wherein said heating means includes a heating circuit that is able to resistively heat said second sensing piece in raising said temperature thereof.

11. The fluid delivery apparatus of claim 2, further comprising:
a diagnostic controller for determining and indicating a delivery error of said fluid delivery apparatus that causes a difference between said average flow rate of said first fluid and said predetermined injection rate value out of a pre-determined range.

12. The fluid delivery apparatus of claim 11, wherein said diagnostic controller is configured to:
determine an open-time value indicative of said open time of said solenoid valve in response to at least said first sensing signal and said second sensing signal;
determine an open-time tolerance range in response to at least said predetermined injection rate value; and
indicate a fault if said open-time valve is out of said open-time tolerance range.

13. The fluid delivery apparatus of claim 11, wherein said diagnostic controller is configured to:
determine a delivery-rate value indicative of a delivery rate of said first fluid during said open time in response to at least said first sensing signal and said second sensing signal;
determine a delivery-rate tolerance range in response to at least said predetermined injection rate value; and
indicate a fault if said delivery-rate valve is out of said delivery-rate tolerance range.

* * * * *